United States Patent [19]
Travis

[11] Patent Number: 5,813,706
[45] Date of Patent: Sep. 29, 1998

[54] VARIABLE RADIAL ORIENTATION PIPE CONNECTOR

[75] Inventor: Billy W. Travis, Broken Arrow, Okla.

[73] Assignee: Hydrant Repair Parts, Inc., Tulsa, Okla.

[21] Appl. No.: 861,079

[22] Filed: May 21, 1997

[51] Int. Cl.[6] .................................................. F16L 19/025
[52] U.S. Cl. .......................... 285/363; 285/184; 285/368; 285/414
[58] Field of Search .................................. 285/184, 363, 285/368, 412, 405, 413, 414, 415

[56] References Cited

U.S. PATENT DOCUMENTS

| | | | |
|---|---|---|---|
| 390,770 | 10/1888 | Garnier et al. | |
| 783,987 | 2/1905 | Walsh | 285/184 |
| 1,475,867 | 11/1923 | Peterson | 285/184 |
| 2,532,891 | 12/1950 | Chupp | 285/130 |
| 2,699,344 | 1/1955 | Bissell | 285/131 |
| 3,144,261 | 8/1964 | Stephens | 285/363 |
| 3,507,506 | 4/1970 | Tillman, III | 277/225 |
| 5,174,615 | 12/1992 | Foster et al. | 285/334 |

FOREIGN PATENT DOCUMENTS

| | | | |
|---|---|---|---|
| 115118 | 5/1942 | Australia | 285/184 |
| 531981 | 1/1922 | France | 285/363 |
| 1055534 | 2/1954 | France | 285/363 |
| 48269 | 6/1966 | Germany | 285/363 |

OTHER PUBLICATIONS

Buried Pipe Design by A.P. Moser, 1990, pp. 2, 4–6.
Practical Piping Handbook, by Otto Mendel, 1981, pp. 25–30, 73, 91.

*Primary Examiner*—Dave W. Arola
*Attorney, Agent, or Firm*—Head, Johnson & Kachigian

[57] ABSTRACT

A variable radial orientation pipe MJ connector for engagement with a pair of bell end fittings. The MJ connector includes a tubular sleeve having opposed open ends. A pair of flanges are integral with the sleeve, each flange extending radially outward from the sleeve. Each flange is spaced inwardly from an open end. A shoulder extends axially from each flange to abut a circular gasket. A plurality of axially aligned arcuate slots in each flange receive fasteners therethrough whereby the radial orientation of the connector to the bell end fittings may be selected.

7 Claims, 7 Drawing Sheets

VARIABLE RADIAL ORIENTATION PIPE CONNECTOR

BACKGROUND OF THE INVENTION

1. Field of the Invention.

The present invention is directed to a variable radial orientation pipe connector which may be used in fluid transportation applications to provide a sealable joint for connecting the bell ends of fittings.

2. Prior Art.

In water works and other fluid flow applications, ductile cast-iron pipe has been utilized having a bell or hub at one end which receives an open end of another pipe section. Various stresses may be present on the piping system. Pressure flow systems may provide axial pressure on the pipes and fittings. Soil mechanics may also exert forces on the piping system. External tie-rods and blocking have been used to address these stresses although they are costly and time consuming.

A mechanical joint (MJ) is often utilized to provide a sealed fitting between pipes and pipe fittings or connectors. A mechanical joint is a bolted joint wherein the fitting or pipe end includes a bell end with a recess extending inwardly into the bell to provide a seating surface for a circular gasket. The circular gaskets and mechanical joints are of standardized dimensions for interchangeability.

A radial flange extends outward from the pipe surface. A male or spigot end of a mechanical joint is required to connect to the bell end. When the fitting is brought together with a pipe end or a MJ connector end, axial pressure from fasteners through the flanges encourages a fluid tight seal therebetween. A fluid tight seal must be created and axial movement must be prevented. Moreover, American National Standards (ANSI) and American Water Works Association (AWWA) regulations specify that joints shall be watertight for anticipated pressures.

Bell end piping and mechanical joints are used extensively in the water works industry including in distribution systems of interconnected pipe networks. MJ connectors having a cylindrical body with a pair of integrally cast radially extending flanges have been employed in the past but are not radially adjustable. A series of bolt openings are provided in the flanges, the number of which is determined by the pipe diameter.

It is oftentimes desirable to provide a variable radial orientation between the MJ connector and bell end.

In the past, two of the most popular types of adjustable connections have been plant manufacture MJ connectors and field fabrication MJ connectors. In the plant manufacture MJ connector, an integrally cast flange or gland is established on one end of the fitting and a rotating ring flange or gland is established on the opposite end. The rotating ring gland is manufactured in two halves and requires the halves to be installed around the tubular sleeve with the halves fastened together before the rotating ring gland is aligned with and connected to the fitting.

In the field fabrication MJ connector, a flange ring is slipped over the pipe outside diameter and set screws are tightened axially through the flange ring and into the pipe. The flange ring has a series of bolt hole openings parallel to the axis for receipt of fasteners.

Installation of these MJ connectors often takes place in adverse conditions by only semi-skilled personnel. There is still a need for a one-piece connector that is simple to manufacture and install.

It is, therefore, a principal object and purpose of the present invention to provide a MJ connector that will join a pair of bell end fittings or pipes.

It is an additional object and purpose of the present invention to provide a variable radial orientation MJ pipe connector which may be radially adjusted in the field at the time of installation to nearly any radial orientation.

It is a further object and purpose of the present invention to provide a radially variable MJ pipe connector fabricated from a single cast part which will incorporate all radial orientations.

It is an additional object and purpose of the present invention to provide a MJ connector to join valves, hydrants and other equipment to tees, wyes, crosses and other fittings.

It is an additional object and purpose of the present invention to provide MJ connectors that will anchor valves and fire hydrants.

It is an additional object and purpose of the present invention to provide MJ connectors that reduce installation man hours.

SUMMARY OF THE INVENTION

The present invention is directed to a variable radial orientation MJ connector to join a pair of bell end fittings. A cylindrical, tubular sleeve has a pair of open ends that are opposed to each other. A pair of flanges, integral with the sleeve, extend radially outward from the sleeve. Each flange is spaced inwardly from its respective open end. Each flange includes a shoulder which extends outward axially towards the open end. The shoulders will be utilized to stop and abut circular gaskets which can be received over the sleeve.

A plurality of arcuate slots are provided in each of the flanges. Each arcuate slot is axially aligned with the axis of the tubular sleeve. Six arcuate slots are provided in each flange in the present embodiment with each arcuate slot extending approximately 30° radially. The pipe diameter determines the number of fasteners provided per MJ connector. Thus, 6 inch diameter pipe utilize six bolts for each end. Therefore, a 6 inch diameter MJ connector will require six arcuate shots each extending a minimum of 30° radially to achieve 360° rotation.

A bolt will pass through each arcuate slot and pass through an opening in the bell end flange. Thereafter, a nut will be tightened onto each bolt to fasten the connector to the bell end flange and create a seal.

DETAILED DESCRIPTION OF THE PREFERRED EMBODIMENTS

Figure 1:
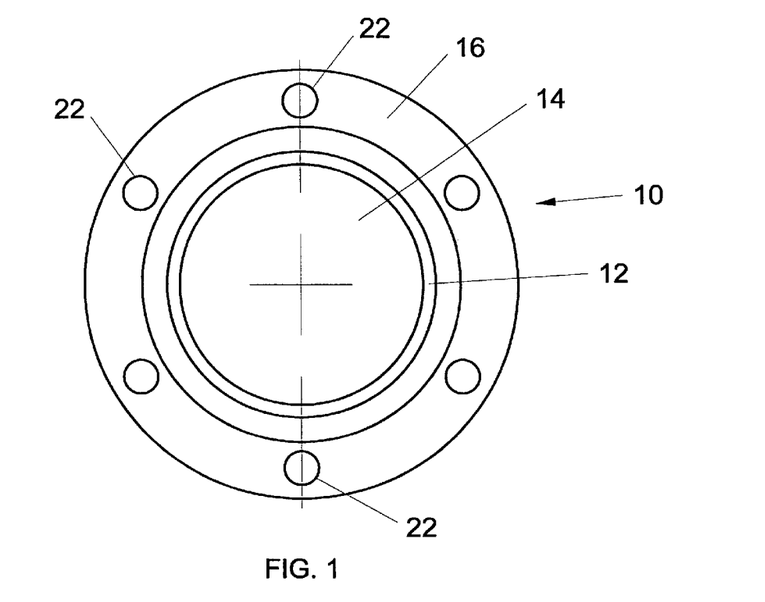
FIGS. 1 and 2 illustrate a prior art connector with integrally cast pipe flanges.
Figure 2:
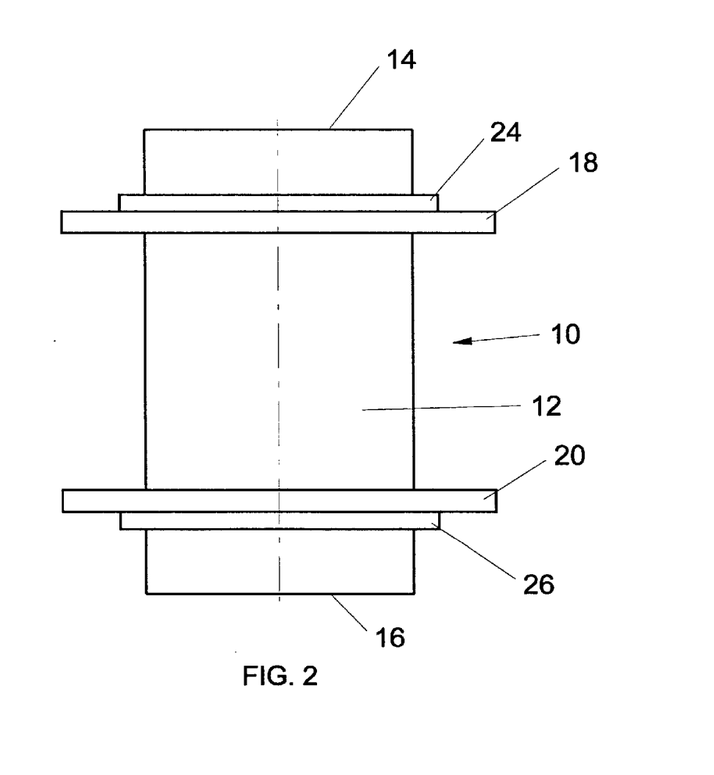

Referring to the drawings in detail, FIGS. 1, 2, 3 and 4 show prior art designs for MJ connectors to join a pair of bell end fittings (not shown in FIGS. 1, 2, 3 and 4). FIGS. 1 and 2 illustrate an integrally cast connector 10 which has a tubular or cylindrical sleeve 12 with opposed open ends 14 and 16. As will be seen, the sleeve 12 has an internal diameter or ID equal to the diameter of the fitting or valve to be connected. The sleeve is of a predetermined, often standard length.

Spaced inwardly from the open ends 14 and 16 are integral flanges 18 and 20 that extend radially outward from the surface of the sleeve 12.

Each flange 18 and 20 has a series of circular bolt openings 22 which receive bolts therethrough and join with the flange of a bell end connector or fitting (not shown in FIGS. 1 and 2). Each flange 18 and 20 also has a shoulder 24 and 26, respectively, extending axially from the flange to abut a circular gasket. The flange and shoulder are spaced inwardly sufficiently from the sleeve end to receive a circular gasket.

The MJ connector 10 is not radially adjustable except that the MJ connector may be moved to align with a different bell end flange opening.

Figure 3:
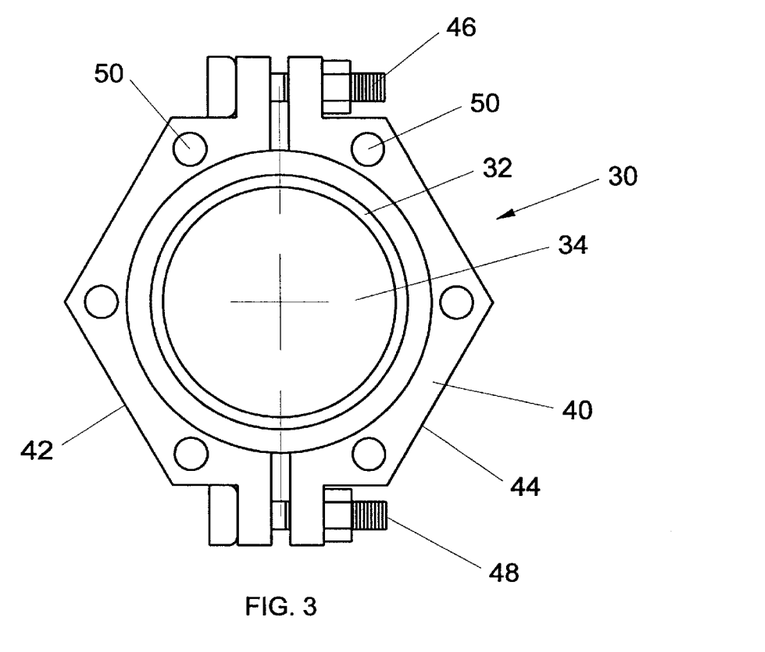
FIGS. 3 and 4 illustrate a prior art connector with integrally cast pipe flange on one end and rotating ring flange on the opposite end.
Figure 4:
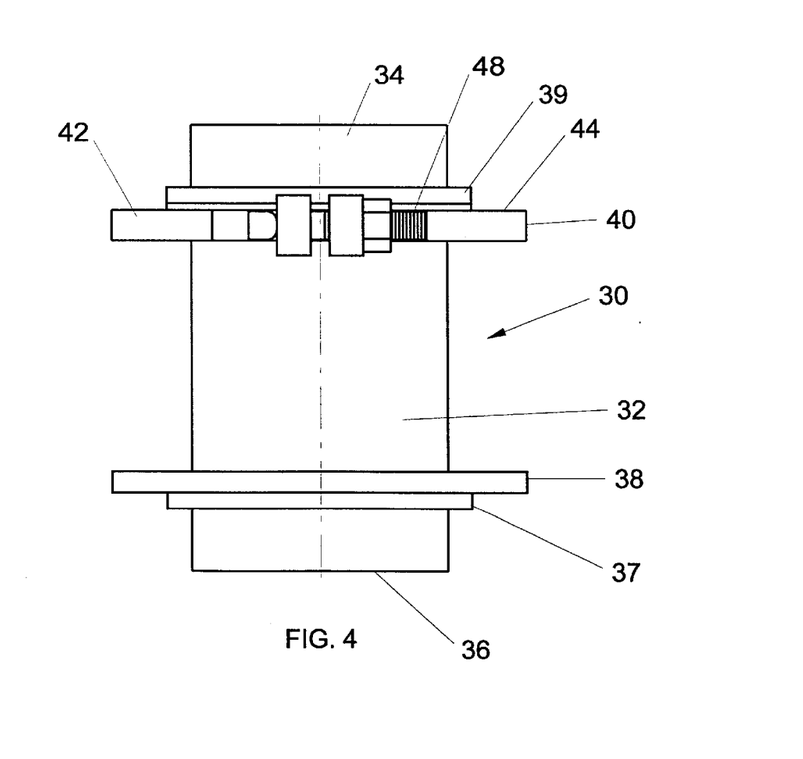

FIGS. 3 and 4 show an alternate prior art MJ connector design illustrating a partial rotating feature. MJ connector 30 has a tubular sleeve body 32 with a pair of open ends 34 and 36. A single, integrally cast flange 38 is rigidly secured to the tubular body 32. At the opposite end of the sleeve body, an adjustable flange 40 is composed of two half circular sections 42 and 44 which allow for radial rotation of the flange prior to clamping together with a set of fasteners 46 and 48. The adjustable flange 40 has a series of bolt openings 50 to receive threaded bolts therethrough. While this serves to allow variable radial orientation, it requires a separate flange 40 consisting of two circular sections 42 and 44 and additional fasteners 46 and 48. This requires additional parts and additional installation steps. Each flange 38 and 40 also has a shoulder 37 and 39, respectively, extending axially from the flange to abut a circular gasket.

Figure 5:
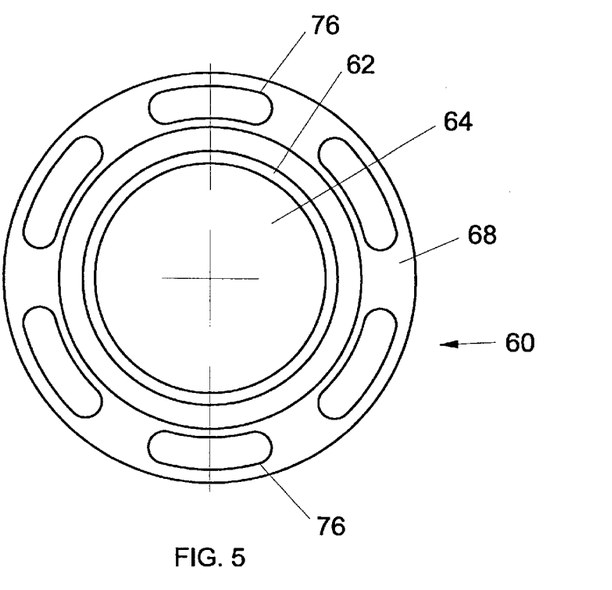
FIG. 5 illustrates an end view of a variable radial orientation MJ pipe connector constructed in accordance with the present invention.
Figure 6:
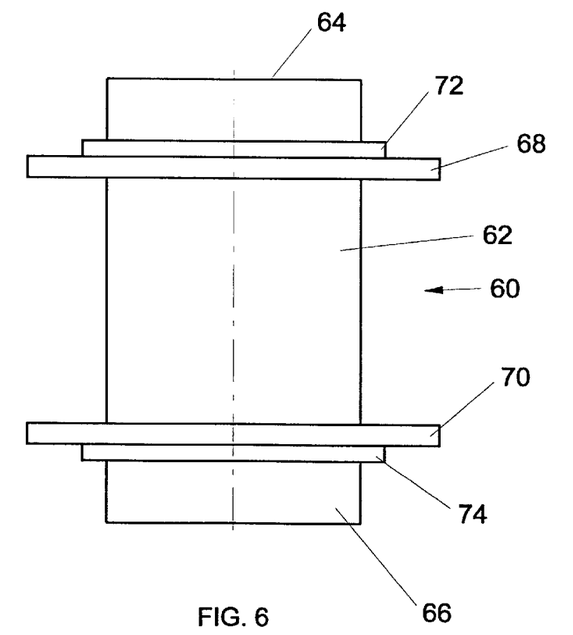
FIG. 6 illustrates a top or side view of the variable radial orientation pipe connector shown in FIG. 5.
Figure 7:
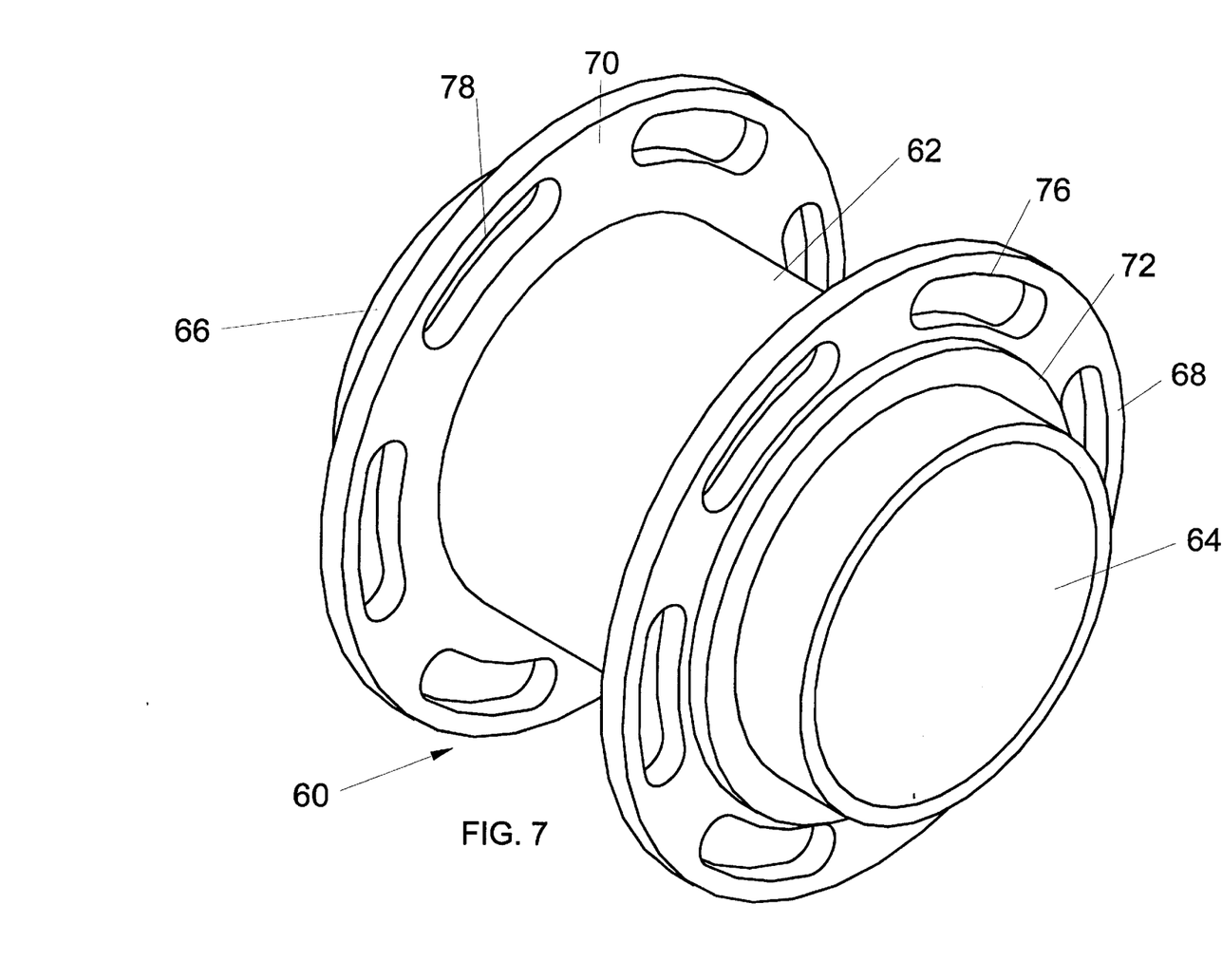
FIG. 7 illustrates a perspective view of the variable radial orientation MJ pipe connector shown in FIG. 5.

FIGS. 5, 6 and 7 illustrate the present invention. The present invention is capable of addressing a number of issues. An installer in the field will more easily be able to install the present connector without perfect alignment of the MJ connector with the bell end fitting. The present MJ connector will also be easier to install between piping systems that are not perfectly aligned.

A variable radial orientation MJ connector 60 includes a cylindrical, tubular sleeve 62 having a pair of opposed open ends 64 and 66. The tubular sleeve 62 is of a predetermined, standard length. A pair of integral flanges 68 and 70 extend radially outward from the sleeve 62. Each flange 68 and 70 is spaced inwardly axially from the open ends, 64 and 66, respectively. Additionally, each flange 68 and 70 includes a shoulder 72 and 74, respectively, which extends outward toward the open ends 64 and 66. As will be seen, the shoulders abut circular gaskets which can be received over the sleeve (not shown in FIGS. 5–7).

The flanges and shoulders are spaced inwardly from the open ends to receive circular gaskets (to be described herein).

The outside diameter of the tubular sleeve 62 from the flanges 68 and 70 to the open ends 64 and 66, respectively, may be tapered slightly toward the open ends 64 and 66.

As best seen in FIGS. 5 and 7, a plurality of arcuate slots 76 and 78 are provided in flanges 68 and 70, respectively.

Each of the arcuate slots 76 and 78 is axially aligned with the axis of the tubular sleeve 62. In the present embodiment, the required number of arcuate slots are provided in each flange. It has been found that an arcuate slot extending approximately 30° radially in a six inch diameter MJ connector will allow a wide variety of radial orientations between the connectors 60 and the bell end fitting to be connected to. Six arcuate slots are provided in the 6 inch diameter connector. With each slot extending a minimum of 30°, the six arcuate slots together will provide total radial openings of at least 180°. The connector may thus be rotated 30° while the bolts are in one set of slots. The connector may be moved on to adjacent openings.

A bolt (not shown in FIGS. 5, 6 and 7) or other fastener will pass through each arcuate slot and pass through an opening in the bell end flange. Thereafter, a nut will be tightened onto the bolt to fasten the MJ connector 60 to the bell end flange.

Figure 8:
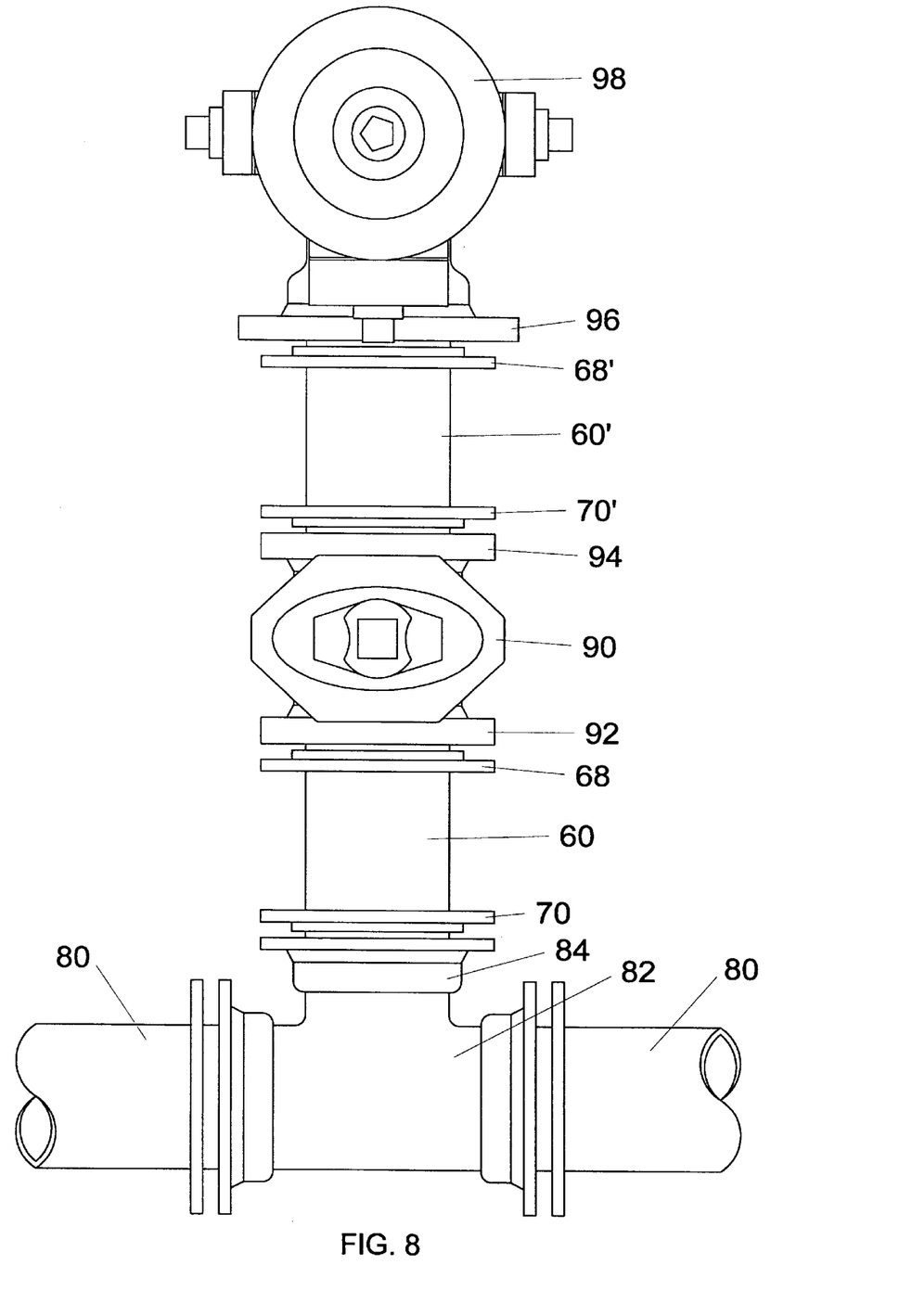
FIG. 8 illustrates a top view of the MJ connectors of the present invention as shown in FIG. 5 in use in one application of the present invention.

FIG. 8 illustrates the MJ connectors 60 of the present invention in usage in one application in the water works industry. A water main 80 is part of a water works transmission or distribution system. The distribution system distributes water for various uses through an interconnected pipe network.

A T-connector 82 terminates in a bell end 84 having a radially extending flange. The bell end fitting 84 will be joined with the MJ connector 60 of the present invention. One of the open ends 64 or 66 of the MJ connector 60 will be inserted into the bell end 84 along with an elastomeric gasket or seal which will reside in the bell end and abut against shoulder 74 extending from the flange 70 of the MJ connector 60. The tubular sleeve 62 is in fluid communication with and has the same outside diameter as the internal diameter of T-connector 82.

In the present application, the MJ connector 60 is joined at the opposite end 64 to a valve 90 which has a pair of bell ends 92 and 94. Each bell end 92 and 94 has a radially extending flange. The open end 64 of MJ connector 60 is inserted into the bell end 92 of valve 90 along with an elastomeric circular gasket.

An additional MJ connector 60' is also juxtaposed between bell end 94 of the valve 90 and a fire hydrant shoe 96. The shoe 96 is in fluid communication with fire hydrant 98 when the fire hydrant 98 main valve is open.

Figure 9:
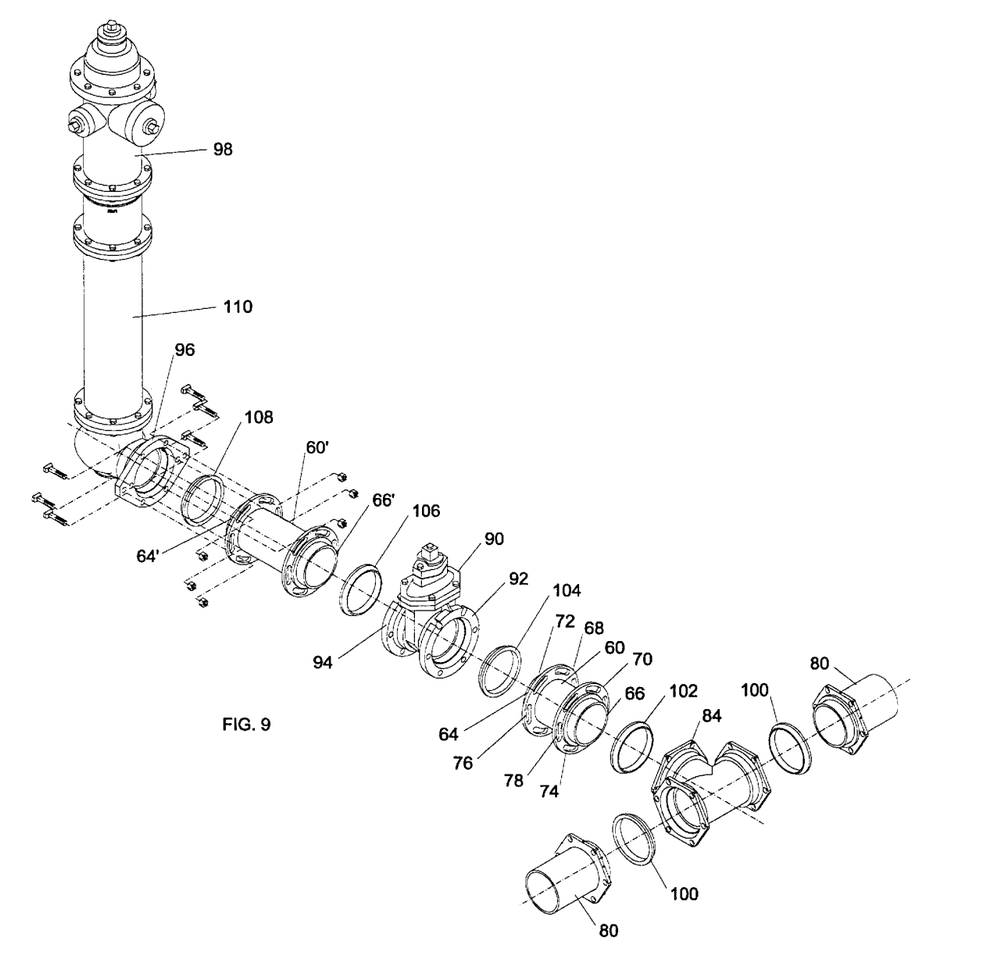
FIG. 9 illustrates an exploded view of the application shown in FIG. 8.

FIG. 9 illustrates a partial, exploded view of the water works application shown in FIG. 8.

The water main 80 is connected to the T-connector through bell ends in the T-connector which receive gaskets 100. The bell end 84 receives a gasket 102 and the open end 66 of MJ connector 60.

The gasket 102 will reside in bell end 84 and abut against the shoulder 74 of flange 70. A plurality of bolt fasteners will pass through the openings in the radial flange of bell end 84. The bolts will also pass through arcuate slots of MJ connector 60. The MJ connector 60 will thereafter be rotated about its axis until the proper radial alignment is chosen. The nuts will thereafter be tightened down to the bolts to fasten and seal the MJ MJ connector 60 to the T-connection 82. In like manner, the opposite open end 64 of the MJ connector 60 will be joined to the valve bell end 92. A gasket 104 is received in the bell end 92 of the valve. The open end 64 of the MJ connector 60 will be inserted through the gasket 104 and into the bell end 92. The gasket will abut against the shoulder 72 of the flange 68. The fasteners will be passed through openings in the bell end flange and into arcuate slots 76 of the flange. The valve 90 may be radially rotated to a chosen orientation before the fasteners are secured.

Likewise, the MJ connectors 60' may be secured to the opposite bell end 94 of valve 90. A circular gasket 106 is inserted into the open bell end 94 along with the open end 66' of MJ connector 60'.

The end 64' of MJ connector 60' is connected to shoe 96. A circular gasket 108 is inserted into the open shoe end 96 along with the open end 64' of MJ connector 60'. The shoe 96 is, in turn, connected to lower pipe barrel 110 which, in turn, is in fluid communication with fire hydrant 98 when the main valve is open.

Figure 10:
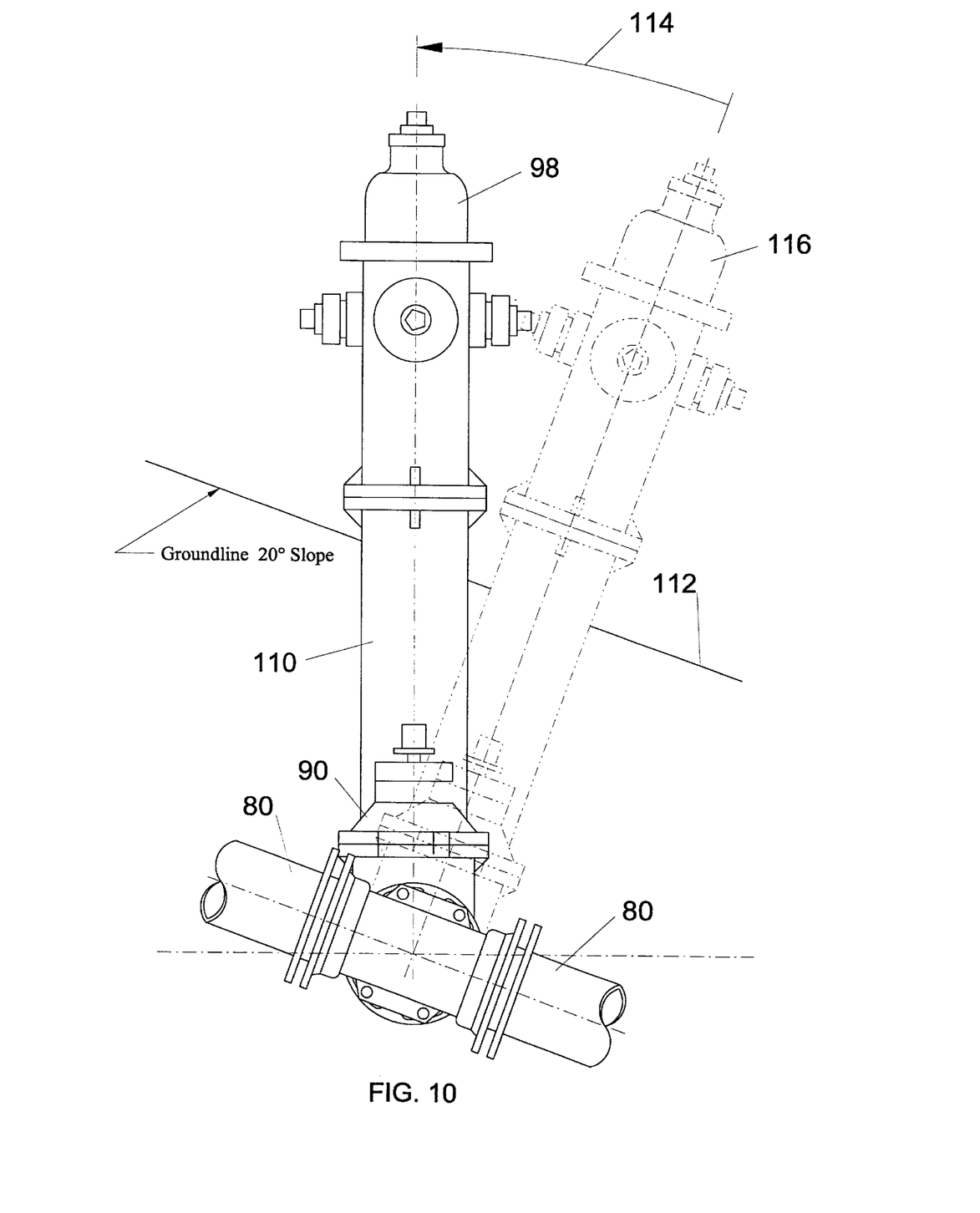
FIG. 10 illustrates the MJ connector of the present invention in one water works application problem solved by the present invention.

FIG. 10 illustrates the problem that is readily resolved by the present invention.

A water main 80 will often be below ground parallel to the surface of the ground line 112. At the same time, a hydrant 98 will be upright so that the MJ connector 60 or MJ connectors 60 will be required to accommodate the ground slope, in this case 20° illustrated by the arrow 114. A radial orientation of 20° from vertical to the water main 80 is illustrated. The dashed lines 116 illustrate hydrant vertical to the water main 80.

Whereas, the present invention has been described in relation to the drawings attached hereto, it should be understood that other and further modifications, apart from those shown or suggested herein, may be made within the spirit and scope of this invention.

What is claimed is:

1. A variable radial orientation pipe connector for engagement with a pair of bell end fittings, which connector comprises:

a unitary tubular sleeve having opposed open ends;

a pair of flanges, integral with said sleeve, each said flange extending radially outward from said sleeve and spaced from each said open end, each said flange having a shoulder to abut a circular gasket, said flanges parallel to each other; and a plurality of coaxially aligned arcuate slots in each said flange to receive fasteners therethrough whereby the radial orientation of the connector to the bell end fittings may be selected.

2. A variable radical orientation pipe connector as set forth in claim 1 wherein said plurality of arcuate slots combine to provide radial openings of at least 180°.

3. A variable radial orientation MJ pipe connector as set forth in claim 1 wherein said sleeve has a six inch diameter and each said flange has six said arcuate slots and each said arcuate slot extends approximately 30° radially.

4. A variable radial orientation pipe MJ connector as set forth in claim 1 wherein said fasteners are threaded bolts and threaded nuts.

5. A variable radial orientation MJ connector as set forth in claim 1 wherein each said shoulder abuts a circular gasket and each said circular gasket is received in one of said bell end fittings.

6. A variable radial orientation MJ connector as set forth in claim 1 wherein each said flange shoulder extends axially from a face of said flange toward said open end.

7. A method of attaching and radially orienting a MJ connector having a first and second open end with a first flange spaced from said first end and a second flange spaced from said second end to a pair of bell end fittings, each said fitting having at least one radially extending flange, which method comprises:

placing a circular gasket on said first open end of said connector;

inserting said first open end of said connector into one said bell end fitting so that said circular gasket resides therein;

inserting bolts through openings in said bell end flange and through arcuate slots in said first flange of said connector;

radially rotating said connector to a suitable radial orientation;

fastening said bolts to join said bell end fitting to said connector; and placing a circular gasket on said second MJ connector open end;

inserting said second open end of said MJ connector into said other bell end fitting so that said circular gasket resides therein; and inserting bolts through openings in said bell end flange and through arcuate slots in said second flange of said MJ connector, said second flange parallel to said first flange.

* * * * *